3,322,762
PRODUCTION OF HEXAMETHYLOL-MELAMINE AND HEXAKIS (METHOXY-METHYL) MELAMINE

J. Alden Erikson, Gibsonia, Pa., and Alexander N. Salem, Brecksville, Ohio, assignors to Pittsburgh Plate Glass Company, Pittsburgh, Pa., a corporation of Pennsylvania
No Drawing. Filed Apr. 8, 1964, Ser. No. 358,376
9 Claims. (Cl. 260—249.6)

This application is a continuation-in-part of copending application Ser. No. 176,122, filed Feb. 27, 1962, now abandoned.

This invention relates to a method of preparing highly methylolated melamine-formaldehyde reaction products in which the methylolation is carried out in an alcoholic medium. This invention further relates to a method of preparing highly alkylated reaction products from the highly methylolated melamine-formaldehyde products, if desired, without the isolation of the methylolated product from the alcoholic reaction medium in which it is produced.

With the advent of water-based automotive finishes, the need for water-soluble and/or water-dispersible resinous components for these finishes has greatly increased. Among the materials which find extensive use for this application are water-soluble melamine-formaldehyde reaction products. Melamine-formaldehyde resins have the desirable property of providing hardness and mar resistance to coatings produced therefrom. Because of these unique properties, they are employed extensively in the preparation of automotive finishes and other coatings, and substantial efforts have been made to prepare water-soluble compositions as substitutes for the more conventional organic solvent-soluble materials. One of the reasons the melamine-formaldehyde reaction products have not been employed extensively in the formulation of water-based compositions is because of the relatively tedious processes required in producing these materials.

In order to provide melamine-formaldehyde reaction products which are substantially water-soluble and stable, they must be substantially fully alkylated, preferably methylated, which presupposes that the melamine itself has been almost completely reacted with formaldehyde to form substantially hexamethylolmelamine. The preparation of these alkylated melamine-formaldehyde reaction products presently involves a time-consuming procedure to insure the desired high degree of alkylation. In this procedure, the melamine is first methylolated with formaldehyde and then alkylated with alcohol.

Because alcohol has uniformly been considered by those skilled in the art to retard or prevent complete reaction between melamine and formaldehyde, the first step, in which the melamine is methylolated with formaldehyde, has heretofore been carried out in an aqueous and essentially nonalcoholic medium. However, because water is known to reverse the alkylation, i.e., the reaction of the methylolated derivative with alcohol, it has been necessary to isolate the intermediate methylolated derivative substantially free from water before the second step is carried out and the alkylating alcohol is added to the reaction mass.

It has now been discovered that the methylolation step, that is, the reaction of formaldehyde with the melamine, may be conducted in the presence of methanol and carried essentially to completion if the concentration of the methanol is rigidly controlled. The amount of methanol employed is that quantity which is sufficient to form a clear solution upon heating of the reaction mass to reaction temperature.

The fact that alcohol can be used at all as the medium of reaction between the formaldehyde and the melamine is unexpected and surprising. The presence of alcohol had heretofore been thought to cause premature precipitation of the incompletely methylolated derivatives which, if isolated, are not useful intermediates in achieving the desirable highly alkylated derivatives. It is not well understood why limited amounts of alcohol can be used to such an advantage in a medium for conducting the methylolation of the melamine, especially in view of the fact that others skilled in the art have gone to great lengths to remove substantially all of the alcohol from the reaction medium during the reaction between the melamine and formaldehyde (see, for example, United States Patent No. 2,998,411).

It is an important aspect of the process of the instant invention that the reaction mixture, upon being heated to reflux, forms a clear, homogeneous solution during the initial reaction, with the melamine completely dissolved. Methylolation occurs and the initial high reflux temperature (82° C. to 87° C.) drops as precipitation of the methylolated melamine occurs and formaldehyde is consumed. Methods of preparation which do not involve this homogeneous stage result in less highly substituted melamine or products containing free melamine which analyze for higher nitrogen content than the ratio of ingredients should provide or are desired.

To achieve this homogeneous phase, the methanol should ordinarily be present in amounts ranging from about 4 to about 12 moles of methanol to 1 mole of melamine during the methylolation step, and for best results, the amount of methanol should be within the range of from about 4.5 to 6 moles of methanol to 1 mole of melamine. If the concentration of methanol is too high, all of the melamine does not go into solution. In this case, the mass remains heterogeneous and cloudy during the heating, probably because as the solution becomes more dilute with methanol, the initial reaction temperature is significantly lowered. Methylolation takes place if less than about 4 moles of alcohol to 1 mole of melamine are employed, but the reaction mass tends to solidify and become difficult to handle.

While usable products may be obtained if the formaldehyde is present in amounts as low as about 6.5 to 1 mole of melamine, it is preferred that at least about 9 moles of formaldehyde to 1 mole of melamine be employed. Greater amounts than 11 moles of formaldehyde also may be used, but such amounts are excessive and provide separation problems subsequent to the reaction.

In the preferred embodiments of the invention, the methylolation reaction is carried out in a reaction mass comprising about 4 to 12 moles of methanol and about 9 to 11 moles of formaldehyde per mole of melamine. The mixture is adjusted to a pH in the range of from about 7 to 9.5, heated until the mixture clears and subsequently precipitates. The precipitate is substantially hexamethylolmelamine and may be isolated if desired, but usually the methylation of the hexamethylolmelamine is conducted without isolation of the intermediate product by merely adding more methanol and reversing the pH to the acid side. The small amounts of water present need not be removed and thus there is no need for drying and isolating the hexamethylolmelamine.

The over-all process of producing hexakis(methoxymethyl)melamine without isolation of the intermediate product takes only one-fourth to one-tenth the amount of time previously needed for the preparation of the alkylated products. The instant process, including isolation of the product, may be carried out in from 6 to 8 hours, whereas the processes formerly utilized generally take from 32 to 80 hours.

The methylation of the hexamethylolmelamine without its isolation is carried out by adding enough methanol to the reaction mixture from the methylolation to provide at least about 20 moles of methanol per mole of melamine. Preferably, the methanol should be present in amounts of at least about 38 moles to 42 moles of the methanol per mole of melamine. Greater amounts may be used but entail long distillation procedures.

In a typical preparation, after adding the methanol and cooling to room temperature (25° C.), the reaction mass is made strongly acid, for example, to a pH between about 1 and about 3, and preferably, about 2, and allowed to exotherm to about 30° C. to 35° C. The reaction clears and the alkylated product is then recovered by neutralizing the reaction mass, for example, to a pH between about 6.5 and about 8, distilling the excess alcohol, azeotropically distilling water formed during the etherification reaction, and drying under vacuum. The same procedure may be employed if the methylolated products has been first isolated. In instances where incomplete alkylation takes place, the isolated alkylated product may be redissolved in alcohol, adjusted to the said acid pH and again recovered in the same manner. The second methylation step uniformly produces the fully methylated derivative, hexakis(methoxymethyl) melamine.

While the formaldehyde, methanol and melamine may be added as separate ingredients, it is preferred that the formaldehyde be added as a methanol solution thereof. A convenient solution containing 55 percent formaldehyde, about 35 percent methanol and 10 percent water, based on the total weight of the solution, is commercially available and is known as methyl Formcel. Since it is desirable to minimize the amount of water present in the medium, there can be used instead a low water-containing methanol solution prepared using methanol, paraformaldehyde and a base catalyst.

The catalysts which are used to adjust the pH to between about 7 and about 9.5 may be varied widely. These include alkali metal and alkaline earth metal hydroxides and basic salts, such as sodium hydroxide, sodium carbonate, sodium bicarbonate, calcium, strontium and barium hydroxides, and the like. Basic organic materials may be used if the do not react with the ingredients in the reaction mass. Tertiary amines can be used advantageously in the methylolation reaction, but should be isolated prior to the alkylation as they cannot ordinarily be effectively separated from the final product.

Acid materials used to readjust the pH to the acid side for the methylation reaction include the inorganic acids, preferably mineral acids, such as hydrochloric acid, sulfuric acid, phosphoric acid; the strong organic acids including the monobasic and dibasic acids, such as oxalic acid, formic acid; the organo-substituted mineral acids, such as benzenesulfonic acid and toluenesulfonic acid, and the like. In many instances, it is advantageous to employ dry hydrogen chloride because of its ability to act as a dehydration catalyst at low temperatures during the alkylation procedure.

The following examples are given by way of illustration and not by way of limitation. All parts and percentages are by weight unless otherwise specified.

*Example I*

A mixture of 126 parts of melamine, 545 parts of methyl Formcel (55 percent formaldehyde, 35 percent methanol, 10 percent water) and 5 parts of 10 percent sodium hydroxide in water was heated with stirring in a flask equipped with a reflux condenser. The solution began to reflux at about 83° C. and became clear and homogeneous. After about 15 minutes, the temperature was 87° C. and the solution became cloudy. Additional methanol (500 parts) was added and the mixture refluxed for 10 minutes. After cooling to room temperature, the precipitate was collected by pressure filtration. There was obtained 235 parts (a 77 percent yield) of substantially hexamethylolmelamine (nitrogen content found 27.1 percent, calculated 27.4 percent). The filtrate contained 11.85 percent free formaldehyde.

The hexamethylolmelamine produced above was methylated by adding thereto 950 parts of methanol and 47 parts of concentrated hydrochloric acid. The mixture was stirred for 15 minutes at ambient temperature and then neutralized with 150 parts of powdered sodium bicarbonate and 20 parts of powdered sodium carbonate to a pH of 7.1. The reaction mass was concentrated under reduced pressure at 36° C. to 78° C. and 110 millimeters to 24 millimeters pressure, and then 300 parts of toluene were added and the mass was pressure filtered. Reconcentration of 426 parts of the filtrate at 48° C. to 96° C. and 50 millimeters to 12 millimeters pressure, and finally at 95° C. and 0.2 millimeter pressure for 15 minutes gave 206 parts (72 percent yield) of a product having the following properties:

Nitrogen (percent):
    Found _____ 22.2
    Calculated _____ 21.6
Ash (parts per million) _____ 8
Hydroxyl number _____ 18.2

This material crystallizes on cooling to 25° C.

*Example II*

A mixture of 126 parts of melamine, 550 parts of methyl Formcel and 5 parts of 10 percent sodium hydroxide was heated on a steam bath to reflux in a flask equipped with a reflux condenser, stirrer and thermometer. At 84° C. the solution became clear and on further heating clouded. After 8 to 10 minutes, 500 parts of methanol were added and the reaction mass was cooled with water to 25° C. A solution of 20 parts of hydrogen chloride gas dissolved in 100 parts of methanol was then added. The resulting solution exothermed to 32° C. and was allowed to cool while stirring for 30 minutes.

The reaction mass was neutralized with about 85 parts of sodium bicarbonate (powdered) to a pH of 6.6 to 8. The excess alcohol was distilled off at a pot temperature of 20° C. to 47° C. and pressure of 65 millimeters to 22 millimeters. The formed water of reaction was then azeotropically distilled at atmospheric pressure with benzene until the distillate was clear. The residue was pressure filtered and the filtrate concentrated under vacuum (60 to 14 millimeters) at 30° C. to 91° C. The resulting product was substantially hexakis(methoxymethyl)melamine (nitrogen content found 21.24 percent; calculated 21.60 percent). This material crystallizes on aging.

*Example III*

To a flask equipped with reflux condenser, stirrer and thermometer were added 550 parts of methyl Formcel, 5 parts of 10 percent sodium hydroxide and 126 parts of melamine. The mixture, which had a pH of 9.0, was heated to reflux. The reaction mass cleared and then clouded, and was held at reflux for an additional 30 minutes. Then 900 parts of methanol were added and with the temperature at 54° C., 10 parts of 85 percent orthophosphoric acid were added.

The reaction mass was heated to reflux and held until the solution was essentially clear, about 1 hour. Forty (40) parts of sodium bicarbonate were added to neutralize to a pH of 7 to 8. Rapid distillation was effected to 68° C. to 96° C. at atmospheric pressure, and then 300 parts of toluene were added and the water was azeotropically distilled off at 84° C. to 105° C. The residue was pressure filtered and concentrated at 93° C. to 11 millimeters pressure. There was obtained 347 parts (89 percent yield) of a product comprising substantially hexakis(methoxymethyl)melamine having a nitrogen content of 21.95 percent, compared to the calculated value of 21.60 percent.

The substantially completely alkylated products of the present invention are obtained usually in a syrupy form which provides a mass having physical properties easily adaptable for blending with other resins and/or solvents. The syrupy product upon standing or cooling usually crystallizes. Products having the higher degree of methylation crystallize sooner, while those having a less than substantially complete methylation crystallize only after several weeks or not at all.

The alkylated products as exemplified above are made up substantially of hexakis(methoxymethyl)melamine. However, while ordinarily being 90 percent or more alkylated, they may contain some of the methylol derivative, as shown by their lack of complete crystallinity at room temperature. In these instances, an essentially completely alkylated and crystalline product can be obtained by a second alkylating treatment.

To illustrate this, 390 parts of alkylated product made as in Example III was charged into a vessel with 800 parts of methanol and 10 parts of 10 percent orthophosphoric acid. The resulting mixture was heated to reflux and held for one hour. Sodium bicarbonate (45 parts) was added to effect neutralization to a pH of 7.2. The resulting product was recovered as before by vacuum distillation, filtration and azeotropic removal of the water. The resultant product was crystalline and had an infrared curve substantially identical to commercially available hexakis(methoxymethyl)melamine. The fully methylated methylolmelamines are distinguished by having increased infrared absorption in the region of about 3 microns and an appearance in the region of about 7.2 microns and about 11.2 microns.

The methylated methylolmelamine of this invention can be obtained in over-all yields ranging around 85 percent to 95 percent, and have nitrogen values usually within 0.2 percent of theoretical. These products form clear, water-white solutions ordinarily having a Gardner-Holdt viscosity at 25° C. of less than A at a solids content of between 55 percent and 65 percent, and have a xylene tolerance of infinity, a mineral spirits tolerance of greater than 50 pounds of spirits per 100 pounds of resin solution, and an acid number of less than 1 when determined on a solids basis. The products can be solubilized in water in amounts of up to 33 percent product in water at 25° C.; as the temperature increases, the solubility decreases accordingly and at 60° C. only 16 percent is soluble.

According to the provisions of the patent statutes, there are described above the invention and what are now considered to be its best embodiments. However, within the scope of the appended claims, it is to be understood that the invention can be practiced otherwise than as specifically described.

What is claimed is:

1. A process of methylolating melamine which comprises reacting melamine with formaldehyde at a pH of from about 7 to about 9.5 in a reaction mixture containing at least about 6.5 moles of formaldehyde per mole of melamine and from about 4 to about 12 moles of methanol per mole of melamine.

2. The process of claim 1 in which the reaction mixture contains from about 4.5 to about 6 moles of methanol per mole of melamine.

3. A process of producing substantially hexamethylolmelamine which comprises reacting melamine with formaldehyde by heating a reaction mixture comprising from about 4 to about 12 moles of methanol and about 9 to about 11 moles of formaldehyde per mole of melamine at a pH between about 7 and about 9.5 to form a clear solution, and maintaining said pH until a precipitate is formed.

4. A process of producing substantially completely methylated hexamethylolmelamine which comprises reacting melamine with formaldehyde at a pH of from about 7 to about 9.5 in the presence of at least about 6.5 moles of formaldehyde and from about 4 to about 12 moles of methanol per mole of melamine to form a reaction mixture which clears on heating, maintaining said pH until a precipitate is formed, adding more methanol to provide at least about 20 moles of methanol per mole of melamine, adjusting the pH to between about 1 and about 3, and heating until the reaction mass is essentially clear.

5. A process of producing substantially hexakis(methoxymethyl)melamine which comprises reacting melamine with formaldehyde by heating a reaction mixture comprising from about 4 to about 12 moles of methanol and from about 9 to about 11 moles of formaldehyde per mole of melamine at a pH between about 7 and about 9.5 to form a clear solution, maintaining said pH until a precipitate is formed, adding more methanol to provide at least about 20 moles of methanol per mole of melamine, adjusting the pH to between about 1 and about 3, and heating until the reaction mass is essentially clear.

6. A process of producing substantially hexakis(methoxymethyl)melamine which comprises reacting melamine with formaldehyde by heating a reaction mixture comprising from about 4.5 to about 6 moles of methanol and from about 9 to about 11 moles of formaldehyde per mole of melamine at a pH between about 7 and about 9.5 to form a clear solution, maintaining said pH until a precipitate is formed, adding more methanol to provide at least about 20 moles of methanol per mole of melamine, adjusting the pH to between about 1 and about 3, and heating until the reaction mass is essentially clear.

7. The process of claim 6 wherein the added methanol provides from about 38 to about 42 moles of methanol per mole of melamine.

8. A process of producing substantially completely methylated hexamethylolmelamine which comprises reacting melamine with formaldehyde by heating a reaction mixture comprising from about 4.5 to about 6 moles of methanol and from about 9 to about 11 moles of formaldehyde per mole of melamine at a pH between about 7 and about 9.5 to form a clear solution, maintaining said pH until a precipitate is formed, adding more methanol to provide at least about 20 moles of methanol per mole of melamine, adjusting the pH to a value between about 1 and about 3, heating until the reaction mass is essentially clear, adjusting the pH to between about 6.5 and about 8, distilling off the excess methanol and azeotropically distilling the water from the reaction mass.

9. The process of claim 8 wherein the resulting product is redissolved in methanol, adjusted to a pH between about 1 and about 3, and heated until the solution becomes clear.

References Cited

UNITED STATES PATENTS

| | | | |
|---|---|---|---|
| 2,715,619 | 8/1955 | Suen | 260—249.6 |
| 2,998,411 | 8/1961 | Housekeeper | 260—249.6 |
| 3,160,608 | 12/1964 | Polansky et al. | 260—249.6 |

WALTER A. MODANCE, *Primary Examiner.*

JOHN M. FORD, *Assistant Examiner.*